United States Patent

Yamanaka et al.

[11] Patent Number: 6,058,032
[45] Date of Patent: May 2, 2000

[54] MULTIPLEX PULSE-WIDTH MODULATION POWER CONVERTER

[75] Inventors: Katsutoshi Yamanaka; Toshihiro Sawa; Eijiro Tajima, all of Fukuoka, Japan

[73] Assignee: Kabushiki Kaisha Yaskawa Denki, Kitakyushu, Japan

[21] Appl. No.: 09/147,399

[22] PCT Filed: Jun. 16, 1997

[86] PCT No.: PCT/JP97/02059

§ 371 Date: Dec. 17, 1998

§ 102(e) Date: Dec. 17, 1998

[87] PCT Pub. No.: WO97/49170

PCT Pub. Date: Dec. 24, 1997

[30] Foreign Application Priority Data

Jun. 17, 1996 [JP] Japan .................................. 8-155576
Sep. 18, 1996 [JP] Japan .................................. 8-246499

[51] Int. Cl.[7] .................................................. H02M 7/00
[52] U.S. Cl. .............................................. 363/71; 318/768
[58] Field of Search .................................. 363/65, 71, 97, 363/98, 131, 132; 318/767, 768, 769

[56] References Cited

U.S. PATENT DOCUMENTS 5,040,105 8/1991 Dhyanchand et al. ................. 363/71 X
5,355,296 10/1994 Kuo et al. .............................. 363/71 X

FOREIGN PATENT DOCUMENTS 61-236373 10/1986 Japan .
63-95856 4/1988 Japan .
3-70472 3/1991 Japan .
8-256405 10/1996 Japan .

*Primary Examiner*—Y. J. Han
*Attorney, Agent, or Firm*—Oblon, Spivak, McClelland, Maier & Neustadt, P.C.

[57] ABSTRACT

A multiple pulse-width modulation power conversion device for variable-speed drive of a three-phase AC motor comprises three units ($11_1$, $11_2$, and $11_3$), each unit including n ($n \geq 2$) batteries ($12_{11}$, $12_{12}$, and $12_{13}$), each made up of a DC power supply or at least one battery cell, and n power converters ($13_{11}$, $13_{12}$, and $13_{13}$) for converting the DC power of each of these batteries to single-phase AC power. Single-phase AC terminals within each unit are connected in series, and of the single-phase AC terminals within each unit, one of the single-phase AC terminals that is not connected to the single-phase AC terminal of another power converter is connected to a star connection, and the other is connected to a respective one of three input terminals of a three-phase AC motor. The power conversion device further comprises control circuits ($14_{11}$, $14_{12}$, . . . , $14_{33}$) for controlling the power converters such that the AC outputs applied to the single-phase AC terminals of the n power converters within each unit are of the same phase, and further, for effecting multiple pulse-width modulation such that the AC outputs from the three units are separated by an electrical angle of 120°.

5 Claims, 14 Drawing Sheets

MULTIPLEX PULSE-WIDTH MODULATION POWER CONVERTER

TECHNICAL FIELD

The present invention relates to a power conversion device for an electric vehicle utilizing a battery as a main power supply.

BACKGROUND ART

Power conversion devices for electric vehicles have hitherto required a high-voltage battery as a power supply.

FIG. 1 is a circuit diagram showing a conventional inverter for an electric vehicle. Inverter 502 converts the DC power from battery 503 to three-phase AC power by typically using semiconductor switches 601–606 as shown in FIG. 1 to drive AC motor 501. In this inverter 502, the maximum voltage that can be applied to AC motor 501 as interphase voltage is equal to the battery voltage due to the connections of semiconductor switches 601–606. A relatively inexpensive 200 V motor is typically used as AC motor 501. A DC voltage higher than 282 V ($\approx 200 \times 2^{1/2}$), which is the amplitude of AC 200 V, is therefore required as the minimum input voltage of inverter 502 in order to obtain three-phase 200 V AC power as an AC output from inverter 502. A battery having a voltage of approximately 300 V is thus necessary to drive the 200-V motor.

To produce high voltage in a battery, however, 110 to 190 batteries each having cells of several volts each must be connected in series. A additionally, to charge a large number of batteries connected in series, a high-voltage direct-current voltage higher than that of the batteries must be produced by means of a charger. When charging a battery in which a large number of cells are connected in series, moreover, the voltages of each of the cells cannot be completely equalized due to the individual differences between the characteristics of each of the cells, and thereby causing variations in the charging conditions of each cell. The number of serial connections in the battery should therefore be reduced to a minimum to lower the charge voltage. Lowering the battery voltage however results in insufficient direct-current voltage for the AC motor.

DISCLOSURE OF INVENTION

It is an object of the present invention to provide a multiple pulse-width modulation power conversion device for variable-speed drive of a three-phase AC motor that accommodates the use of a low-voltage battery.

A first multiple pulse-width modulation power conversion device of this invention comprises:
  three units, each unit including n (n≧2) batteries each made up of a DC power supply or at least one battery cell, n power converters for converting the DC power of each of the batteries to single-phase AC power, and n residual capacitance detectors for detecting the residual capacitance of the batteries;
  wherein single-phase AC terminals within each unit are connected in series, and of the single-phase AC terminals within each unit, one of the single-phase AC terminals that is not connected to a single-phase terminal of another power converter is connected to a star connection, and the other single-phase AC terminal that is not connected is connected to a respective one of three input terminals of a three-phase AC motor;
  the first multiple pulse-width modulation power conversion device further comprises control circuits for controlling said power converters such that AC outputs applied to single-phase AC terminals of the n power converters within each unit are of the same phase, and moreover, for effecting multiple pulse-width modulation such that AC outputs from the three units are separated by an electrical angle of 120°, and
  each unit further comprises means for determining the ratio of fundamental wave amplitude of AC voltage from the n power converters connected in series, based on the residual capacitance detected by each of the residual capacitance detectors.

When driving a three-phase AC motor at variable speeds using the power conversion device of the above-described construction, the output current and output voltage have a low-skew waveform because waveform control is effected by multiple pulse-width modulation, and in addition, power supply and regeneration are facilitated because conversion from DC to AC is a direct conversion. Further, this embodiment facilitates driving an AC motor by a low-voltage battery and allows incorporation of a battery charging capability to the power conversion device.

The invention thus enables use of voltage of a low-voltage battery, thereby increasing safety, improving charging efficiency. In addition, radio noise can also be reduced because the use of the multiplex system allows the switching frequency of the single-phase PWM inverters to be suppressed to a low level.

Determining the ratio of the fundamental wave amplitude of the output voltage from the single-phase power converters connected in series, based on the residual capacitance of the batteries enables both efficient driving of a three-phase AC motor and efficient charging of batteries even in cases in which the residual capacitance of each of the batteries differs.

A second multiple pulse-width modulation power conversion device of this invention comprises:
  three units, each unit including n batteries (n≧2) each made up of a DC power supply or at least one battery cell, and n power converters for converting the DC power of each of the batteries to single-phase AC power;
  wherein single-phase AC terminals within each unit are connected in series, and of the single-phase AC terminals within each unit, one of the single-phase AC terminals that is not connected to a single-phase terminal of another power converter is connected to a star connection, and the other single-phase AC terminal that is not connected is connected to a respective one of three input terminals of a three-phase AC motor;
  the second multiple pulse-width modulation power conversion device further comprises control circuits for controlling said power converters such that AC outputs applied to single-phase AC terminals of the n power converters within each unit are of the same phase, and moreover, for effecting multiple pulse-width modulation such that AC outputs from the three units are separated by an electrical angle of 120°, and
  wherein a charging power supply and an ON/OFF switch are connected in series between the star connection point of single-phase AC terminals of the three units and the neutral point of the winding of the three-phase AC motor; and after turning on the ON/OFF switch, switching of the conductive states of switch elements in each power converter causes individual charging or batch charging of the batteries of that power converter.

In this case, after switching on the ON/OFF switch, switching the conductive states of the switch elements in a power converter causes individual charging or batch charging of the batteries of that power converter.

A third multiple pulse-width modulation power conversion device of this invention comprises:

a battery made up of a DC power supply or at least one battery cell; and three units, each unit including n (n≧2) first power converters for converting DC power of the battery to AC power, n transformers for insulating output from each first power converter, and n second power converters for converting power from each transformer to single-phase AC power;

wherein the single-phase AC terminals within each unit are connected in series, and of the single-phase AC terminals within each unit, one of the single-phase AC terminals that are not connected to the single-phase AC terminal of another second power converter is connected to a star connection, and the other single-phase AC terminal that is not connected is connected to a respective one of the three input terminals of the three-phase AC motor;

and the third multiple pulse-width modulation power conversion device further comprises control circuits for controlling the second power converters such that AC outputs applied to single-phase AC terminals of the n second power converters within each unit are of the same phase, and moreover, for effecting multiple pulse-width modulation such that AC outputs from the three units are separated by an electrical angle of 120°;

wherein a charging power supply and an ON/OFF switch are connected in series between the star connection point of single-phase AC terminals of the three units and the neutral point of the winding of the three-phase AC motor; and after turning on the ON/OFF switch, switching of the conductive states of switch elements of each power converter causes individual charging or batch charging of the batteries of that power converter.

When driving a three-phase AC motor at variable speeds using the power conversion device of the above-described construction, multiplexing with one battery as the power supply is possible because multiplexing occurs after first converting the power of the battery to AC power and then insulating by a transformer. In addition, waveform control by single-phase pulse-width modulation at each unit made up of a plurality of modules provides output current and output voltage having a low-skew waveform, and also enables easy supply and regeneration of power. When charging, moreover, this power conversion device allows charging of the battery in the regeneration mode of each of the units, thus enabling the incorporation of a charging capability in the power conversion device itself. Finally, safety is enhanced because the input/output of each inverter module can be made low voltage, and safety is further enhanced because the input and output are insulated.

A fourth multiple pulse-width modulation power conversion device of this invention comprises:

a battery made up of a DC power supply or at least one battery cell;

a first power converter for converting the DC power of said battery to AC power;

a transformer taking output of said first power converter as primary-side input and having insulated output on its secondary side; and three units, each unit including n (n≧2) second power converters for converting insulated power from said transformer to single-phase AC power;

wherein the single-phase AC terminals within each unit are connected in series, and of the single-phase AC terminals within each unit, one of the single-phase AC terminals that is not connected to the single-phase AC terminal of another second power converter is connected to a star connection, and the other single-phase AC terminal that is not connected is connected to a respective one of the three input terminals of the three-phase AC motor;

the fourth multiple pulse-width modulation power conversion device further comprises control circuits for controlling the second power converters such that AC outputs applied to single-phase AC terminals of the n second power converters within each unit are of the same phase, and moreover, for effecting multiple pulse-width modulation such that AC outputs from the three units are separated by an electrical angle of 120°;

wherein a charging power supply and an ON/OFF switch are connected in series between the star connection point of single-phase AC terminals of the three units and the neutral point of the winding of the three-phase AC motor; and after turning on the ON/OFF switch, switching of the conductive states of switch elements in each power converter causes individual charging or batch charging of the batteries of that power converter.

In such a case, one battery, one first power converter, and one transformer may be provided to each unit.

When performing variable-speed drive of a three-phase AC motor using a power conversion device of the above-described construction, multiplexing with one battery as the power supply is possible because multiplexing occurs after first converting the power of the battery to AC power and then insulating by a transformer. In addition, the multiple pulse-width modulation waveform control that is carried out at each of the three units made up of a plurality of second power converters provides output current and output voltage having a low-skew waveform, and also allows free and easy supply and regeneration of power. When charging, moreover, this power conversion device allows charging of the battery in the regeneration mode of each of the units, thus enabling the incorporation of a charging capability in the power conversion device itself. Further, safety is enhanced because the input/output voltage of each PWM inverter can be made low voltage, and because the battery and motor are insulated from each other. Finally, the safety of the battery unit is improved because low-voltage batteries can be used.

BEST MODE FOR CARRYING OUT THE INVENTION

Figure 1:
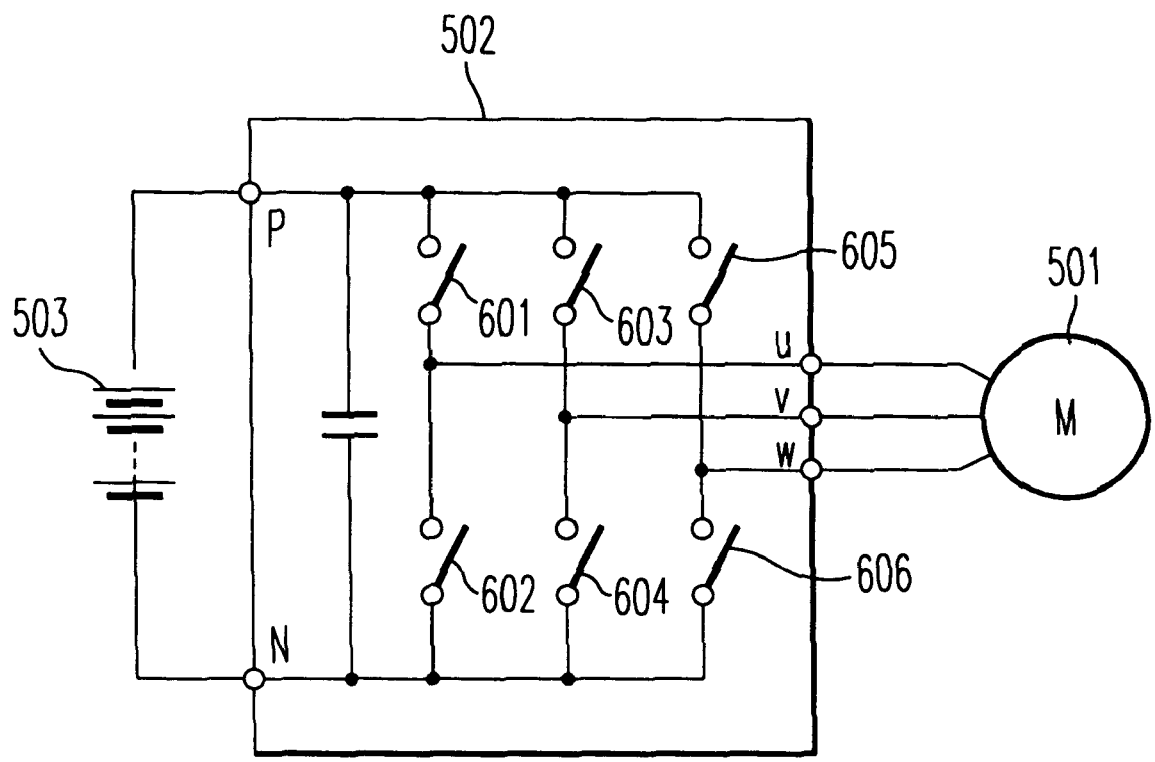
FIG. 1 is a circuit diagram showing a conventional drive circuit utilizing an inverter.
Figure 2:
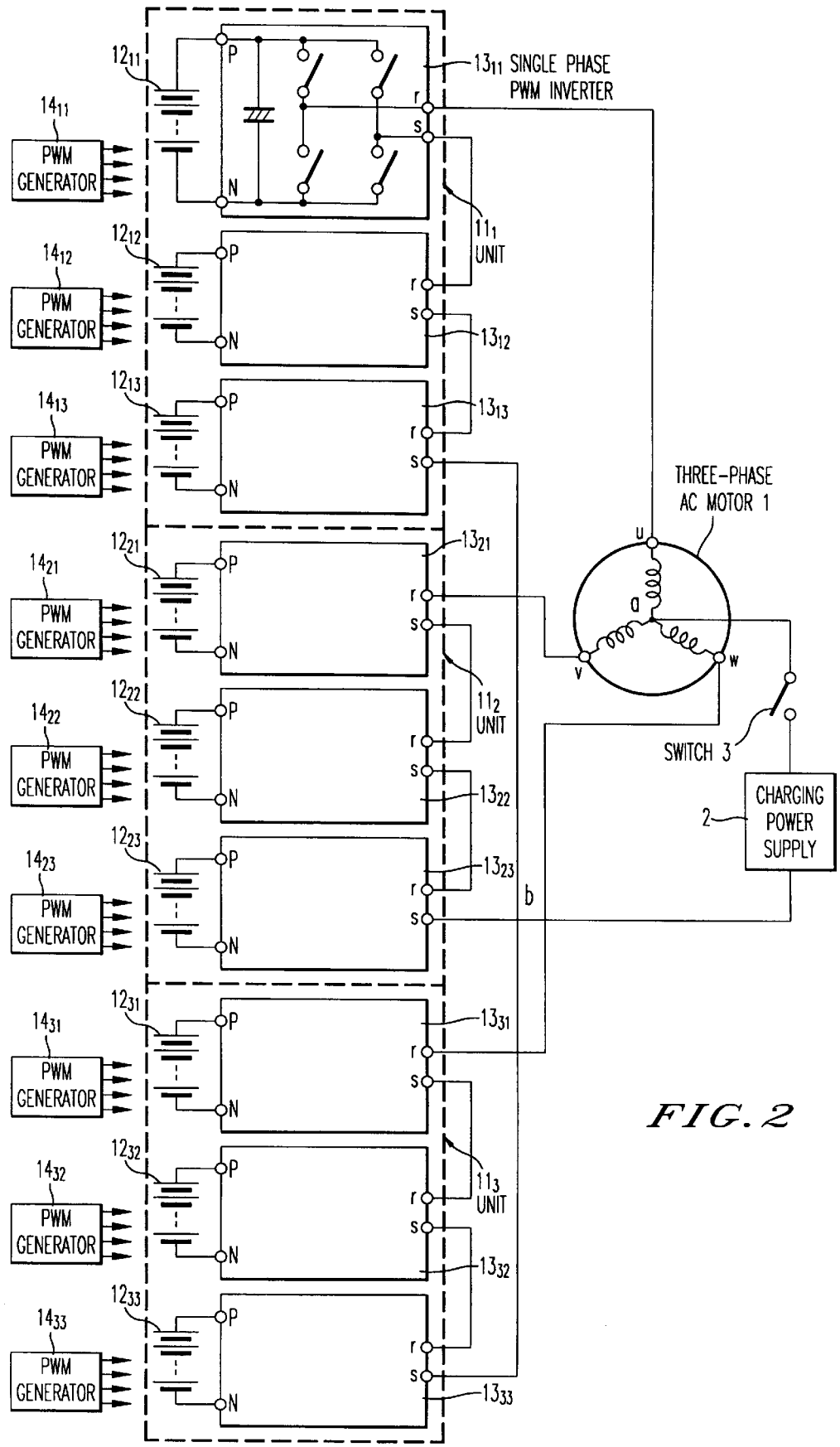
FIG. 2 shows the construction of a multiple pulse-width modulation power conversion device according to a first embodiment of the present invention.

FIG. 2 shows a structural of the power conversion device according to a first embodiment of the present invention. The power conversion device of this embodiment performs variable-speed drive of three-phase AC motor 1, and comprises three units $11_1$, $11_2$, and $11_3$.

Unit $11_1$ comprises three batteries $12_{11}$, $12_{12}$, and $12_{13}$, each made up of one or more battery cells and single-phase PWM inverters $13_{11}$, $13_{12}$, and $13_{13}$, which are power converters that convert the DC power of each of batteries $12_{11}$, $12_{12}$, and $12_{13}$ to single-phase AC power. Unit $11_2$ comprises three batteries $12_{21}$, $12_{22}$, and $12_{23}$, each made up of one or more battery cells and single-phase PWM inverters $13_{21}$, $13_{22}$, and $13_{23}$, which are power converters that convert the DC power of each of batteries $12_{21}$, $12_{22}$, and $12_{23}$ to single-phase AC power. Unit $11_3$ comprises three batteries $12_{31}$, $12_{32}$, and $12_{33}$, each made up of one or more battery cells and single-phase PWM inverters $13_{31}$, $13_{32}$, and $13_{33}$, which are power converters that convert the DC power of each of batteries $12_{31}$, $12_{32}$, and $12_{33}$ to single-phase AC power.

Single-phase AC terminal s of single-phase PWM inverter $13_{11}$, is connected to single-phase AC terminal r of single-phase PWM inverter $13_{12}$, and single-phase AC terminal s of single-phase PWM inverter $13_{12}$ is connected to single-phase AC terminal r of single-phase PWM inverter $13_{13}$. Single-phase AC terminal s of single-phase PWM inverter $13_{21}$ is connected to single-phase AC terminal r of single-phase PWM inverter $13_{22}$, and single-phase AC terminal s of single-phase PWM inverter $13_{22}$ is connected to single-phase AC terminal r of single-phase PWM inverter $13_{23}$. Single-phase AC terminal s of single-phase PWM inverter $13_{31}$ is connected to single-phase AC terminal r of single-phase PWM inverter $13_{32}$, and single-phase AC terminal s of single-phase PWM inverter $13_{32}$ is connected to single-phase AC terminal r of single-phase PWM inverter $13_{33}$. Each of single-phase AC terminals r of single-phase PWM inverter $13_{11}$, $13_{21}$, and $13_{31}$ are connected to input terminals u, v, and w, respectively, of three-phase AC motor 1. Each of single-phase AC terminals s of single-phase PWM inverter $13_{13}$, $13_{23}$, and $13_{33}$ are connected to a star connection (neutral point b).

Charging power supply 2 and switch 3, which connects charging power supply 2 to three-phase AC motor 1 during charging of batteries $12_{11}$–$12_{33}$, are connected in series between the neutral point a of three-phase AC motor 1 and neutral point b.

Figure 3:
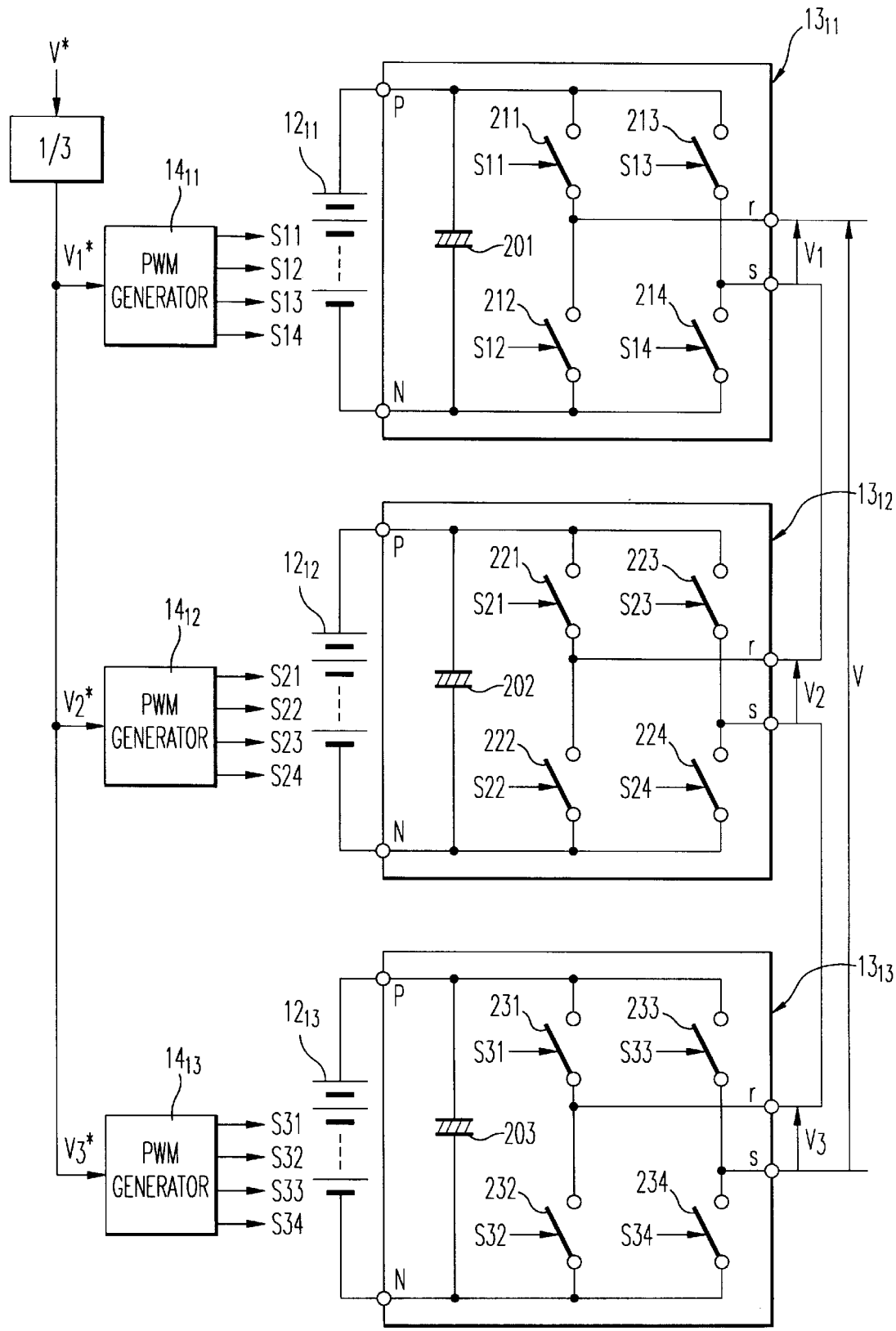
FIG. 3 is a detailed circuit diagram of each of units $11_1$, $11_2$, and $11_3$ in FIG. 2.

FIG. 3 is a circuit diagram showing the details of each of units $11_1$–$11_3$.

Single-phase PWM inverter $13_{i1}$ (i=1–3) includes DC terminals P and N, single-phase AC terminals r and s, semiconductor switches 211–214, capacitor 201, and PWM generator $14_{i1}$, which is a control circuit that produces a PWM waveform in accordance with output voltage command $V_1^*$ (=$V^*$/3, where $V^*$ is the output voltage command of one unit), and turns on/off semiconductor switches 211, 212, 213, and 214 with signals S11, S12, S13, and S14, respectively. Single-phase PWM inverter $13_{i2}$ (i=1–3) includes DC terminals P and N, single-phase AC terminals r and s, semiconductor switches 221–224, capacitor 202, and PWM generator $14_{i2}$, which is a control circuit that produces a PWM waveform in accordance with output voltage command $V_2^*$ (=$V^*$/3, where $V^*$ is the output voltage command of one unit), and turns on/off semiconductor switches 221, 222, 223, and 224 with signals S21, S22, S23, and S24, respectively. Single-phase PWM inverter $13_{i3}$ (i=1–3) includes DC terminals P and N, single-phase AC terminals r and s, semiconductor switches 231–234, capacitor 203, and PWM generator $14_{i3}$, which is a control circuit that produces a PWM waveform in accordance with output voltage command $V_3^*$ (=$V^*$/3, where $V^*$ is the output voltage command of one unit), and turns on/off semiconductor switches 231, 232, 233, and 234 with signals S31, S32, S33, and S34, respectively.

PWM generators $14_{11}$, $14_{12}$, and $14_{13}$ effects control such that the fundamental wave voltages of AC outputs at single-phase AC terminals r and s of single-phase PWM inverters $13_{11}$, $13_{12}$, and $13_{13}$ of unit $11_1$ are of the same phase. Similarly, PWM generators $14_{21}$–$14_{23}$ and $14_{31}$–$14_{33}$ respectively effect control such that the fundamental wave voltages of the AC outputs at the single-phase AC terminals r and s of single-phase PWM inverters $13_{21}$, $13_{22}$, and $13_{23}$ of unit $11_2$ and to the single-phase AC terminals r and s of single-phase PWM inverters $13_{31}$, $13_{32}$, and $13_{33}$ of unit $11_3$ are of the same phase. Multiple pulse-width modulation is then effected such that the phases of the AC outputs of units $11_1$, $11_2$, and $11_3$ are each separated by an electrical angle of 120°. The relation between the interphase voltages $V_{uv}$, $V_{vw}$, and $V_{wu}$ applied between the three input terminals u, v, and w of three-phase AC motor 1 and the AC output voltages $V_u$, $V_v$, and $V_w$ of each of units $11_1$, $11_2$, and $11_3$ is shown as a voltage vector chart in FIG. 4. It can be seen from FIG. 4 that the voltages $V_u$, $V_v$, and $V_w$ necessary for each unit $11_1$–$11_3$ to output should be $\frac{1}{3}^{1/2}$ the amplitude of interphase voltages $V_{uv}$, $V_{vw}$, and $V_{wu}$. In addition, since each unit $11_1$–$11_3$ is made up of three single-phase PWM inverters, the maximum value of the output voltage from each of single-phase PWM inverters $13_{11}$–$13_{33}$ therefore should be $\frac{1}{3} \cdot 3^{1/2}$ the amplitude of interphase voltages $V_{uv}$, $V_{vw}$, and $V_{wu}$ of three-phase AC motor 1, and the battery voltage of single-phase PWM inverters $13_{11}$–$13_{33}$ should also be a voltage higher than $1/3 \cdot 3^{1/2}$ the interphase voltages $V_{uv}$, $V_{vw}$, and $V_{wu}$ of three-phase AC motor 1. Batteries $12_{11}$–$12_{33}$ may therefore be of lower voltage than those of the prior art.

When charging batteries $12_{11}$–$12_{33}$, the three units $11_1$–$11_3$ are connected in parallel with charging power supply 2 because charging power supply 2 is connected to neutral points a and b through switch 3, and batteries $12_{11}$–$12_{33}$ are thus charged. At this time, individual charging or charging by serial connection of each of batteries $12_{11}$–$12_{33}$ is enabled by switching the conductive states of semiconductor switches 211–214, 221–224, and 231–234 of each of single-phase PWM inverters $13_{11}$–$13_{33}$.

Figure 5:
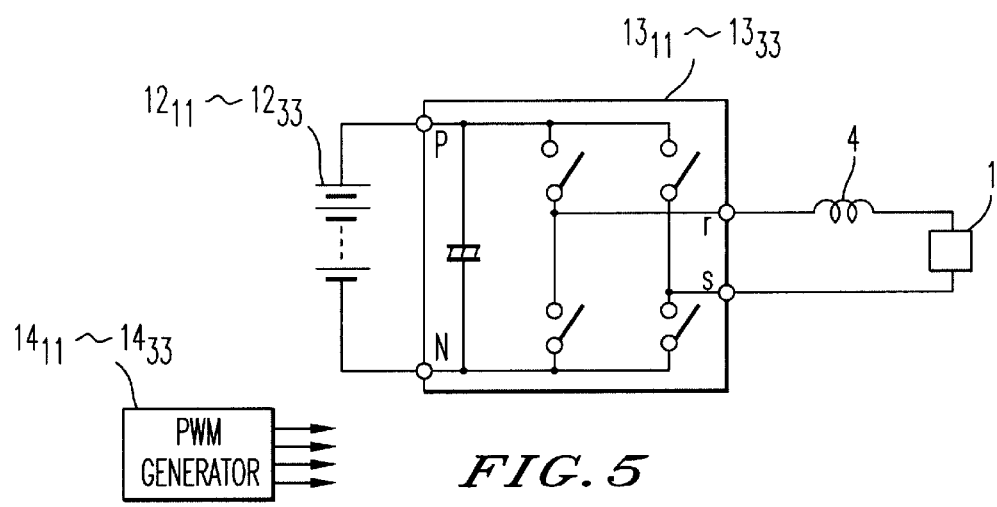
FIG. 5 is a circuit diagram of a PWM converter constituted by connecting switch of a single-phase PWM inverter and the winding reactor of a three-phase AC motor.

In addition, an AC power supply can also be used as charging power supply 2 if the switch elements 211–214, 221–224, and 231–234 of single-phase PWM inverters $13_{11}$–$13_{33}$ are controlled such that batteries $12_{11}$–$12_{33}$ are charged with polarity matched to charging power supply 2. If a large reactor exists in the winding of three-phase AC motor 1, moreover, a PWM converter such as in FIG. 5 can be constructed by switch elements 211–214, 221–224, and 231–234 of single-phase PWM inverters $13_{11}$–$13_{33}$ and winding reactor 4 of three-phase AC motor 1. Batteries $12_{11}$–$12_{33}$ can thus be charged even if the charging power supply voltage is lower than the battery voltage because the PWM converter can boost the power supply voltage.

A PWM generator is provided in each of single-phase PWM inverters $13_{11}$–$13_{33}$ in this embodiment, but it is also possible to control the three single-phase PWM inverters by providing one PWM generator in one unit.

Figure 6:
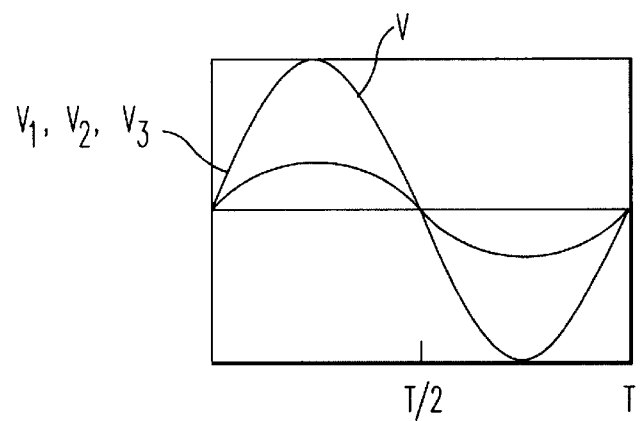
FIG. 6 is a chart showing the fundamental waveforms of the output voltage V and AC voltages $V_1$, $V_2$, and $V_3$ from the single-phase PWM inverters of one unit of the power conversion device shown in FIG. 2.

FIG. 6 is a waveform chart showing the fundamental waves of the output voltage V from one unit and the output voltages $V_1$, $V_2$, and $V_3$ from unit three PWM inverters within one unit (FIG. 3) in the power conversion device of FIG. 2. As can be seen from FIG. 6, output voltage V from one unit equals the sum of the fundamental waves of AC voltages $V_1$, $V_2$, and $V_3$ from the three single-phase PWM inverters, and the fundamental waves of output voltages $V_1$, $V_2$, and $V_3$ from the three PWM inverters are all equal.

When output voltage V is controlled in this way, however, any disparity in the residual capacitance of the batteries will cause the battery with lowest residual capacitance to lose the capacity to output before the other batteries, and as a result, the batteries will lose the capacity to output even if there is sufficient residual capacitance in the batteries overall. When charging batteries, there is also the problem of disparity in the charged state of each cell due to individual differences in cell characteristics.

Figure 7A:
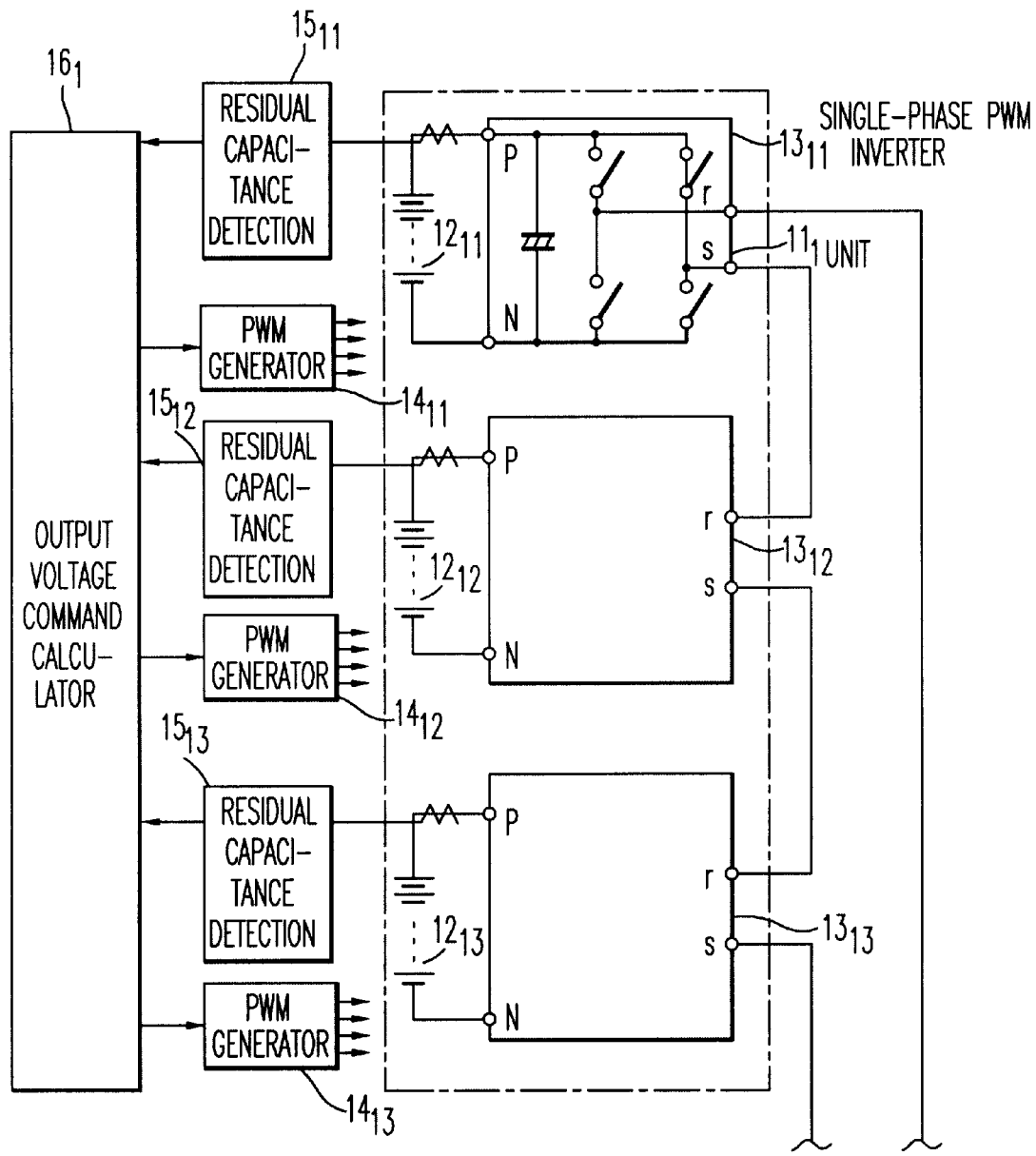
FIG. 7 shows the consturction of the multiple pulse-width modulation power conversion device according to a second embodiment of the present invention.
Figure 7B:
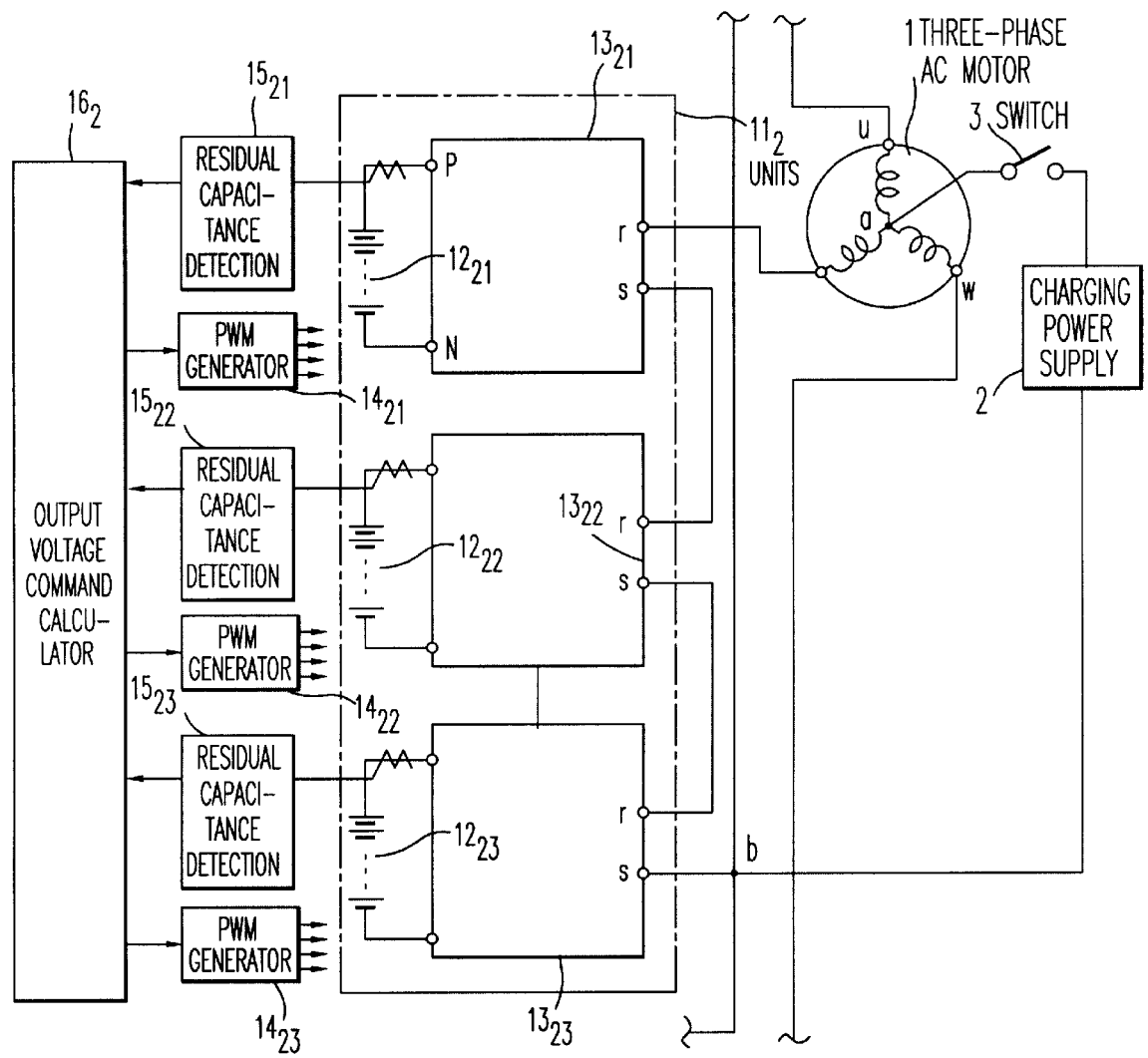
Figure 7C:
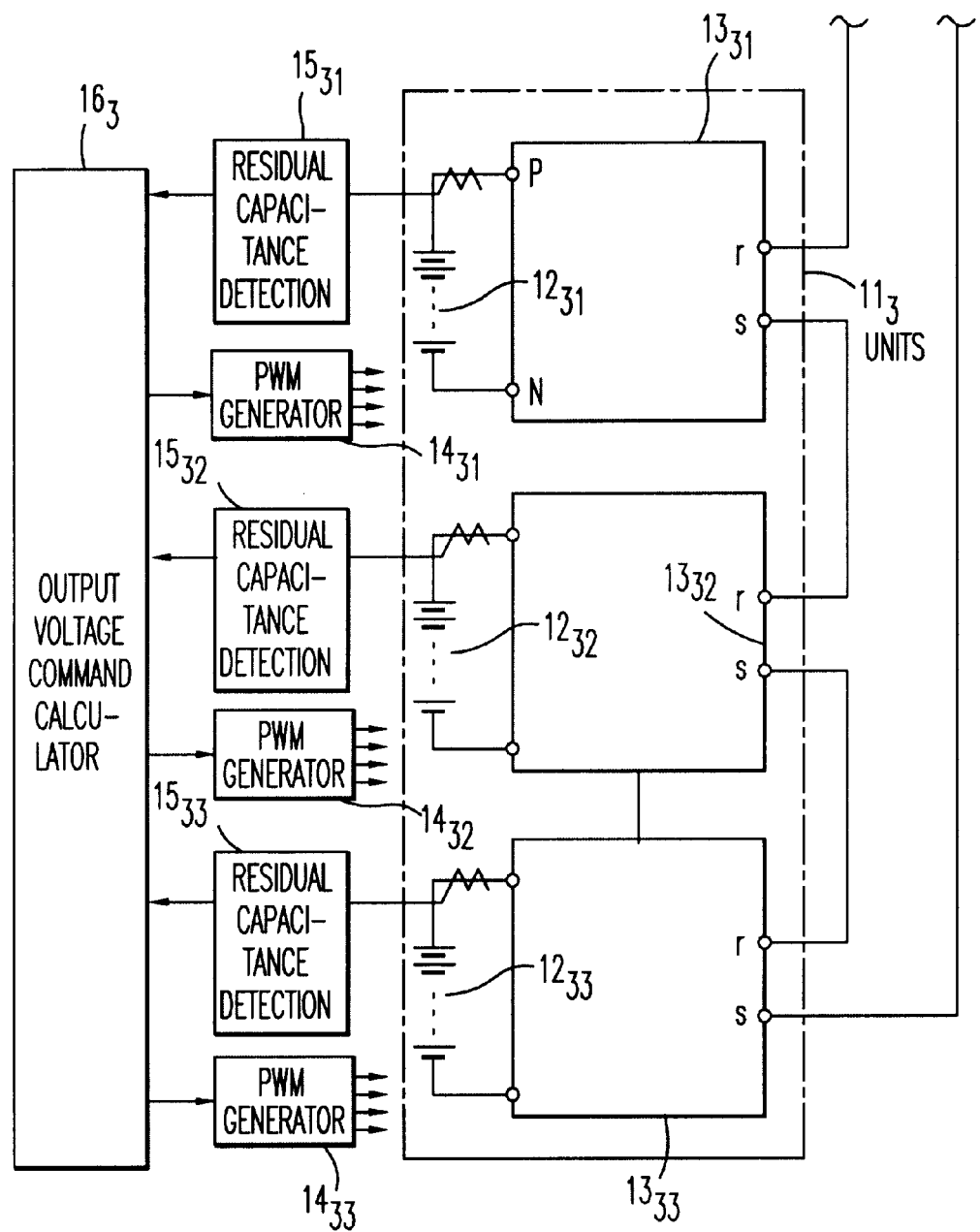

FIG. 7 shows the structure of a multiple pulse-width modulation power conversion device according to a second embodiment of the present invention which solves the aforementioned problems.

This embodiment comprises, in addition to the components of the power conversion device according to the first embodiment: residual capacitance detectors $15_{11}$, $15_{12}$, $15_{13}$ for detecting the residual capacitance of each of batteries $12_{11}$, $12_{12}$, and $12_{13}$, respectively, of unit $11_1$; residual capacitance detectors $15_{21}$, $15_{22}$, $15_{23}$ for detecting the residual capacitance of each of batteries $12_{21}$, $12_{22}$, and $12_{23}$, respectively, of unit $11_2$; residual capacitance detectors $15_{31}$, $15_{32}$, $15_{33}$ for detecting the residual capacitance of each of batteries $12_{31}$, $12_{32}$, and $12_{33}$, respectively, of unit $11_3$; output voltage command computing element $16_1$ for seeking the output voltage commands of single-phase PWM inverters $13_{11}$, $13_{12}$, and $13_{13}$ based on the residual capacitance detected from residual capacitance detectors $15_{11}$, $15_{12}$, and $15_{13}$ and outputting to PWM generators $14_{11}$, $14_{12}$, and $14_{13}$; output voltage command computing element $16_2$ for seeking the output voltage commands of single-phase PWM inverters $13_{21}$, $13_{22}$, and $13_{23}$ based on the residual capacitance detected from residual capacitance detectors $15_{21}$, $15_{22}$, and $15_{23}$ and outputting to PWM generators $14_{21}$, $14_{22}$, and $14_{23}$; and output voltage command computing element $16_3$ for seeking the output voltage commands of single-phase PWM inverters $13_{31}$, $13_{32}$, and $13_{33}$ based on the residual capacitance detected from residual capacitance detectors $15_{31}$, $15_{32}$, and $15_{33}$ and outputting to PWM generators $14_{31}$, $14_{32}$, and $14_{33}$.

Figure 8:
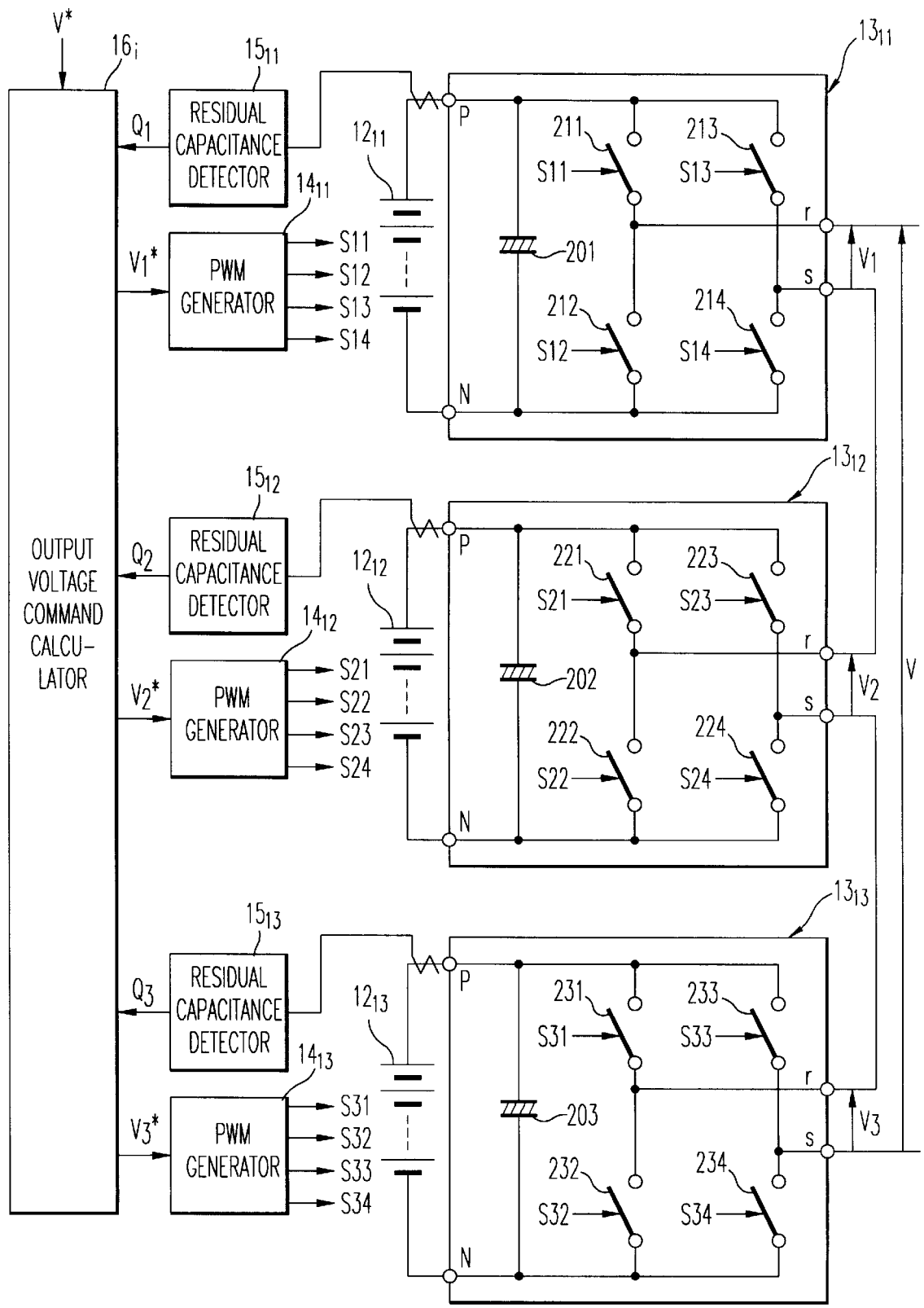
FIG. 8 is a detailed circuit diagram of one unit of the power conversion device shown in FIG. 7.

FIG. 8 is a circuit diagram showing the details of each of units $11_1$–$11_3$. If the output voltage command value for one unit is $V^*$ and the output voltage command values for single-phase PWM inverters $13_{i1}$, $13_{i2}$, $13_{i3}$ (i=1–3) are $V_1^*$, $V_2^*$, and $V_3^*$, respectively; then, when driving three-phase AC motor 1, the output voltage command calculator $16_i$ (i=1–3) calculates the output voltage commands $V_1^*$, $V_2^*$, and $V_3^*$ for single-phase PWM inverters $13_{i1}$, $13_{i2}$, and $13_{i3}$ from the output voltage command $V^*$ for one unit and the residual capacitance $Q_1$, $Q_2$, and $Q_3$ of batteries $12_{i1}$, $12_{i2}$, and $12_{i3}$ each detected at residual capacitance detectors $15_{i1}$, $15_{i2}$, and $15_{i3}$ using the following equations (1), (2), and (3):

$$V_1^* = \{Q_1/(Q_1+Q_2+Q_3)\} \times V^* \tag{1}$$

$$V_2^* = \{Q_2/(Q_1+Q_2+Q_3)\} \times V^* \tag{2}$$

$$V_3^* = \{Q_3/(Q_1+Q_2+Q_3)\} \times V^* \tag{3}$$

and applies $V_1^*$, $V_2^*$ and $V_3^*$ to PWM generators $14_{i1}$, $14_{i2}$, and $14_{i3}$, respectively. PWM generators $14_{i1}$, $14_{i2}$, and $14_{i3}$ produce PWM waveforms in accordance with these output voltage commands $V_1^*$, $V_2^*$, and $V_3^*$ and turn on/off semiconductor switches 211–214, 221–224, and 231–234.

Figure 9:
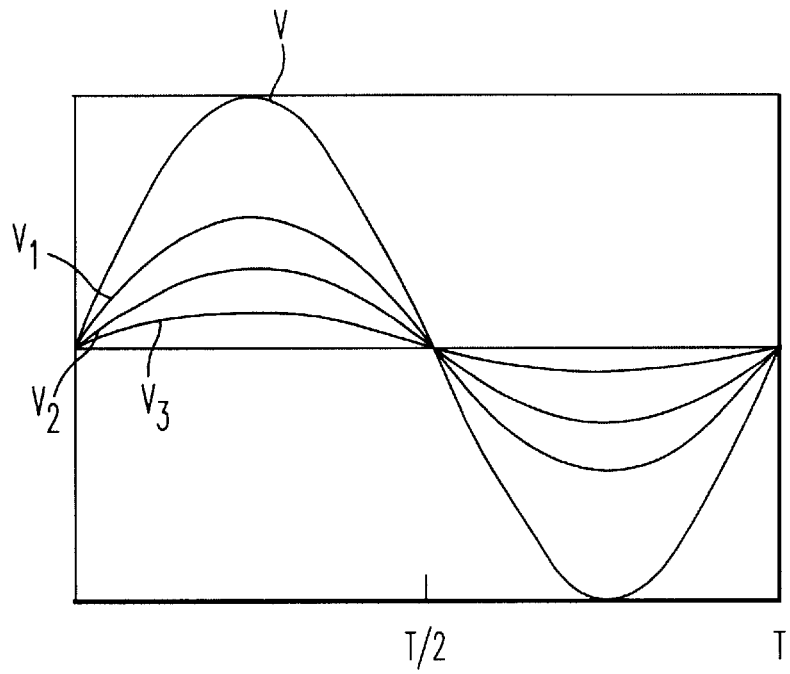
FIG. 9 is a chart showing the fundamental waveforms of output voltage V and AC output voltages $V_1$, $V_2$, and $V_3$ from single-phase PWM inverters of one unit of power conversion device shown in FIG. 7 when driving an AC motor.

For example, when $Q_1$=80%, $Q_2$=50%, and $Q_3$=20%, $V_1^*$=0.53$V^*$, $V_2^*$=0.33$V^*$, and $V_3^*$=0.13$V^*$. FIG. 9 shows the fundamental wave of the output voltage V from one unit and the fundamental waves of the output voltages $V_1$, $V_2$, and $V_3$ from each of the single-phase PWM inverters at this time.

When charging, output voltage command calculator $16_i$ (i=1–3) calculates the output voltage commands $V_1^*$, $V_2^*$, and $V_3^*$ for of single-phase PWM inverters $13_{i1}$, $13_{i2}$, and $13_{i3}$ from the output voltage command $V^*$ for one unit and the residual capacitance $Q_1$, $Q_2$, and $Q_3$ of batteries $12_{i1}$, $12_{i2}$, and $12_{i3}$ each detected by residual capacitance detectors $15_{i1}$, $15_{i2}$, and $15_{i3}$ using the following equations (4), (5), and (6):

$$V_1^* = \{(1-Q_1)/(1-(Q_1+Q_2+Q_3))\} \times V^* \tag{4}$$

$$V_2^* = \{(1-Q_2)/(1-(Q_1+Q_2+Q_3))\} \times V^* \tag{5}$$

$$V_3^* = \{(1-Q_3)/(1-(Q_1+Q_2+Q_3))\} \times V^* \tag{6}$$

and applies $V_1^*$, $V_2^*$ & $V_3^*$ to PWM generators $14_{i1}$, $14_{i2}$, $14_{i3}$, respectively. PWM generators $14_{i1}$, $14_{i2}$, and $14_{i3}$ produce PWM waveform from these output voltage commands $V_1^*$, $V_2^*$, and $V_3^*$ and turn on/off semiconductor switches 211–214, 221–224, and 231–234.

Figure 10:
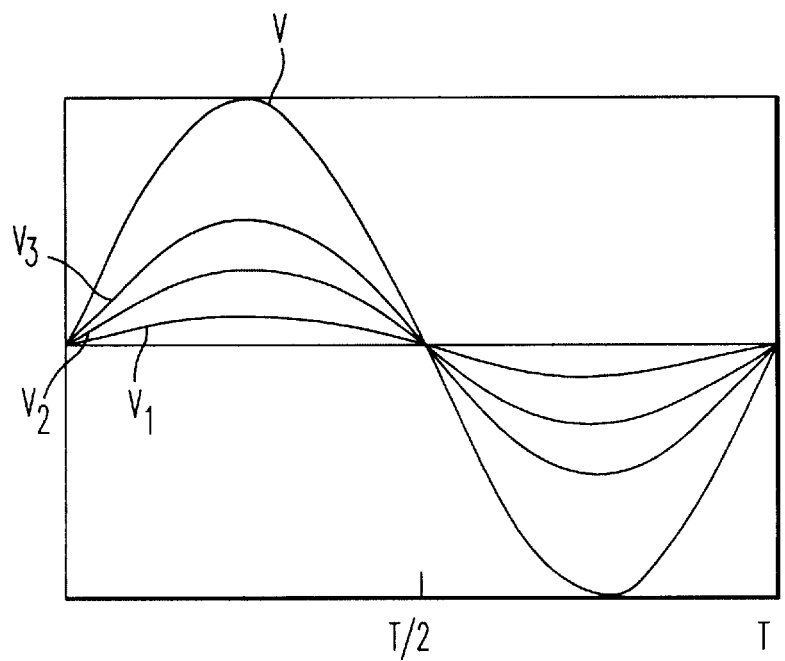
FIG. 10 is a chart showing the fundamental waveforms of output voltage V and the AC output voltages $V_1$, $V_2$, and $V_3$ from single-phase PWM inverters of one unit of the power conversion device shown in FIG. 7 during recharging.

For example, when $Q_1$=80%, $Q_2$=50%, and $Q_3$=20%, $V_1^*$=0.13$V^*$, $V_2^*$=0.33$V^*$, and $V_3^*$=0.53$V^*$. FIG. 10 shows the fundamental wave of output voltage V from one unit and the fundamental waves of the output voltages $V_1$, $V_2$, and $V_3$ from each single-phase PWM inverter at this time.

This embodiment allows three-phase AC motor 1 to be effectively driven and the batteries to be effectively charged even when the residual capacitance of each of the batteries differs.

Figure 11:
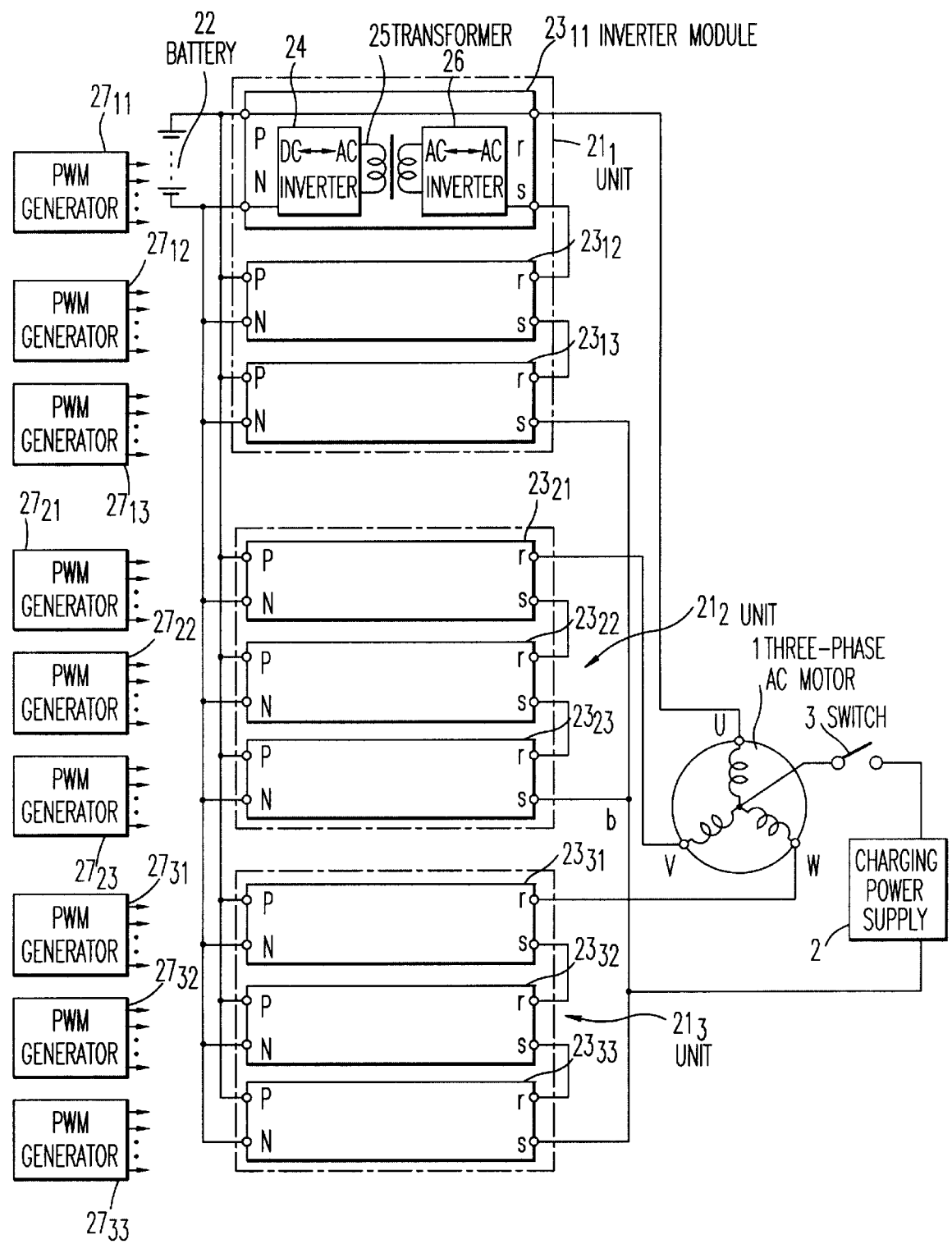
FIG. 11 shows the structure of the multiple pulse-width modulation power conversion device according to a third embodiment of the present invention.

FIG. 11 shows the structure of the multiple pulse-width modulation power conversion device according to a third embodiment of the present invention.

The power conversion device of this embodiment comprises battery 22 made up of at least one battery cell, and three units $21_1$, $21_2$, and $21_3$.

Unit $21_1$ consists of three inverter modules $23_{11}$, $23_{12}$, and $23_{13}$, unit $21_2$ consists of three inverter modules $23_{21}$, $23_{22}$, and $23_{23}$, and unit $21_3$ consists of three inverter modules $23_{31}$, $23_{32}$, and $23_{33}$.

Inverter modules $23_{11}$, $23_{12}$, ..., $23_{33}$ are all of the same construction, each consisting of DC terminals P and N, DC$\leftarrow\rightarrow$AC inverter 24, insulating transformer 25, AC$\leftarrow\rightarrow$AC inverter 26, and single-phase AC terminals r and s. PWM generators $27_{11}$, $27_{12}$, ..., $27_{33}$ are added to inverter modules $23_{11}$, $23_{12}$, ..., $23_{33}$, respectively.

Figure 12:
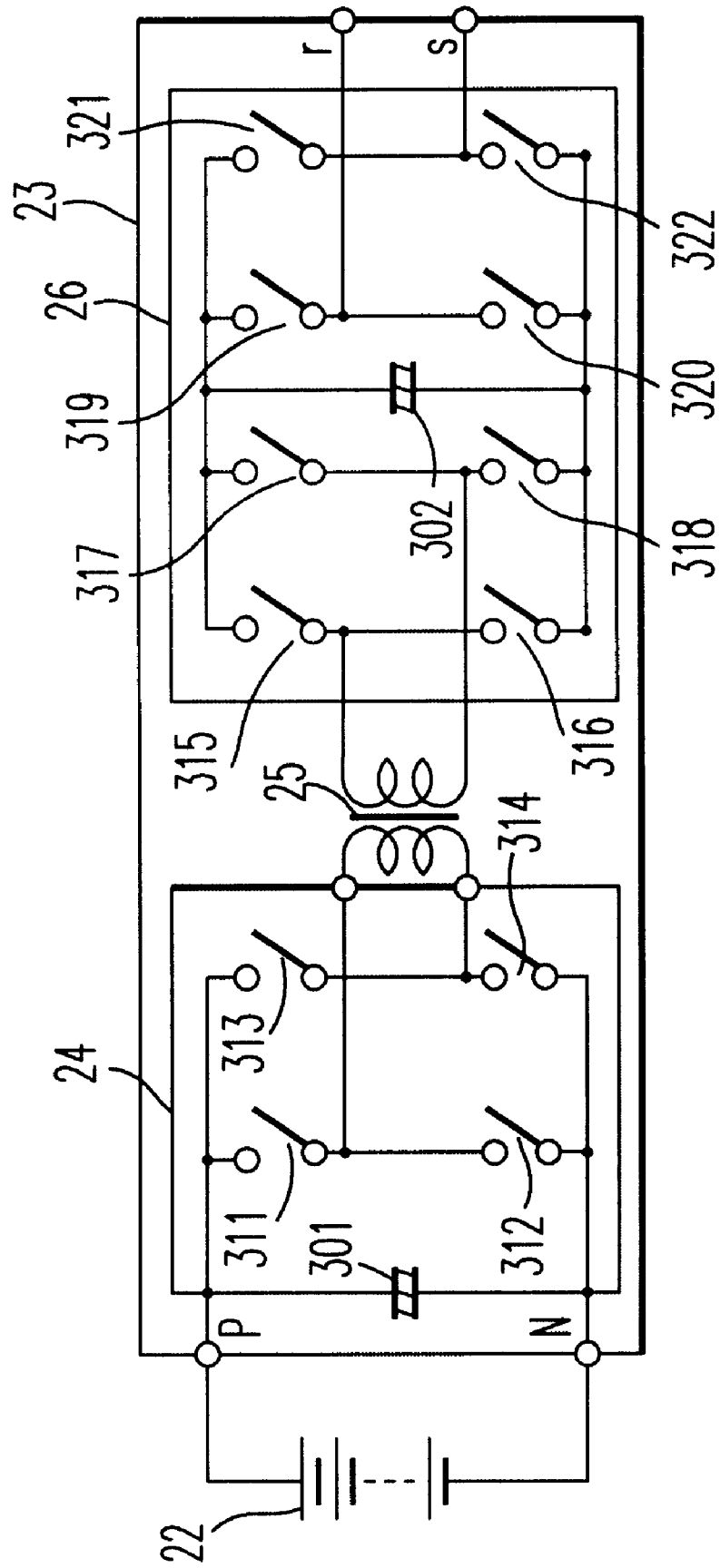
FIG. 12 is a circuit diagram showing DC←→AC inverter 24 and AC←→AC inverter 2 of the power conversion device of FIG. 11.

FIG. 12 is a circuit diagram showing DC$\leftarrow\rightarrow$AC inverter 24 and AC$\leftarrow\rightarrow$AC inverter 26.

DC$\leftarrow\rightarrow$AC inverter 24 consists of capacitor 301 and semiconductor switches 311–314, and AC$\leftarrow\rightarrow$AC inverter 26 consists of capacitor 302 and semiconductor switches 315–322, both inverters being capable of regeneration.

Single-phase AC terminal s of inverter module $23_{11}$ is connected to single-phase AC terminal r of inverter module $23_{12}$, and single-phase AC terminal s of inverter module $23_{12}$ is connected to single-phase AC terminal r of inverter module $23_{13}$. Single-phase AC terminal s of inverter module $23_{21}$ is connected to single-phase AC terminal r of inverter module $23_{22}$, and single-phase AC terminal s of inverter module $23_{22}$ is connected to single-phase AC terminal r of inverter module $23_{23}$. Single-phase AC terminal s of inverter module $23_{31}$ is connected to single-phase AC terminal r of inverter module $23_{32}$, and single-phase AC terminal s of inverter module $23_{32}$ is connected to single-phase AC terminal r of inverter module $23_{33}$. The single-phase AC terminals r of each of inverter modules $23_{11}$, $23_{21}$, and $23_{31}$ are connected to input terminals u, v, and w, respectively, of three-phase AC motor 1. Single-phase AC terminals s of inverter modules $23_{13}$, $23_{23}$, and $23_{33}$ are connected in a star configuration (neutral point b).

Charging power supply 2 and switch 3, which connects charging power supply 2 to three-phase AC motor 1 when charging battery 22, are provided between neutral point b and neutral point a of three-phase AC motor 1.

The three inverter modules within each of units $21_1$, $21_2$, and $21_3$ are controlled by the PWM generator such that the fundamental wave voltages of AC outputs applied to single-phase AC terminals r and s are all the same phase. Furthermore, the three inverter modules are controlled with multiple pulse-width modulation by means of the PWM generators to generate AC outputs such that the fundamental wave voltages from the three units $21_1$, $21_2$, and $21_3$ are separated by an electrical angle of 120° to drive three-phase AC motor 1. The relation between interphase voltages $V_{uv}$, $V_{vw}$, and $V_{wu}$ and the AC output voltages $V_u$, $V_v$, and $V_w$ of each of units $21_1$, $21_2$, and $21_3$ applied between the three input terminals u, v, and w of three-phase AC motor 1 is shown as a voltage vector chart in FIG. 4. From FIG. 4, it can be seen that the voltages $V_u$, $V_v$, and $V_w$ necessary for each of units $21_1$–$21_3$ to output should be $1/3^{1/3}$ the amplitude of interphase voltages $V_{uv}$, $V_{vw}$, and $V_{wu}$, respectively. In addition, since each of units $21_1$–$21_3$ consists of three inverter modules, the maximum output voltage from each of inverter modules $23_{11}$–$23_{33}$ should be $1/3 \cdot 3^{1/2}$ the amplitude of interphase voltages $V_{uv}$, $V_{vw}$, and $V_{wu}$ of three-phase AC motor 1, and the battery voltage of inverter modules $23_{11}$–$23_{33}$ should also be a voltage higher than $1/3 \cdot 3^{1/2}$ the interphase voltages $V_{uv}$, $V_{vw}$, and $V_{wu}$ of three-phase AC motor 1. Semiconductor switches 311–322 of inverter modules $23_{11}$–$23_{33}$ can therefore be for lower voltage than in the prior art.

Since output terminals r and s of inverter modules $23_{11}$–$23_{33}$ are insulated from input terminals P and N, the inputs to each of inverter modules $23_{11}$–$23_{33}$ can be taken from one battery 22. In addition, since transformer 25 is incorporated within inverter modules $23_{11}$–$23_{33}$, the values of input voltage and output voltage can be freely determined at the design stage by changing the turn ratio of transformer 25. In addition, the input voltage to AC$\leftarrow\rightarrow$AC inverter 26 can be freely varied if a configuration is adopted in which a step-up/step-down converter is controlled by DC$\leftarrow\rightarrow$AC inverter 24 and transformer 25. Further, raising the frequency of AC power passing through transformer 25 allows the use of a compact transformer as transformer 25. Inverter modules $23_{11}$–$2_{33}$ need only accommodate capacitance in which the overall output is divided by the number of inverter modules (in this case, nine), and each of inverter modules $23_{11}$–$23_{33}$ can therefore be miniaturized.

When charging, the three units $21_1$, $21_2$, and $21_3$ are connected in parallel with charging power supply 2 when AC or DC charging power supply 2 is connected to neutral points a and b by way of switch 3. Battery 22 can then be charged if regeneration control is performed such that the power of one or a plurality of inverter modules flows from AC terminals r and s to DC terminals P and N.

Figure 13:
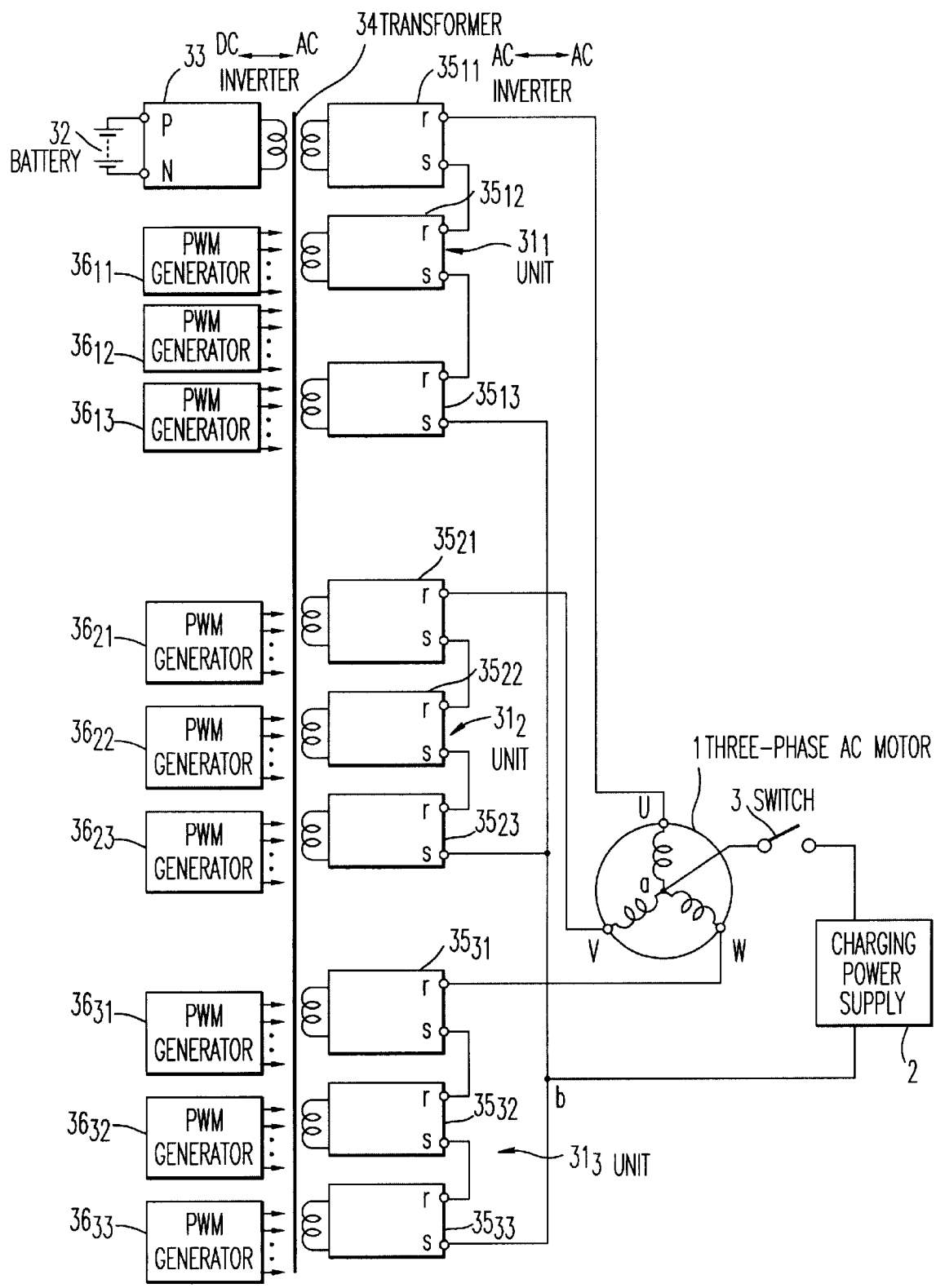
FIG. 13 shows the structure of the multiple pulse-width modulation power conversion device according to a fourth embodiment of the present invention.

FIG. 13 shows the structure of a power conversion device employing multiple pulse-width modulation according to a fourth embodiment of the present invention.

The power conversion device of this embodiment consists of battery 32 made up of at least one battery cell; DC$\leftarrow\rightarrow$AC inverter 33 for converting the DC power of battery 32 to AC power; transformer 34 that takes the output of DC$\leftarrow\rightarrow$AC inverter 33 as primary side input and that has insulated output on the secondary side; and units $31_1$, $31_2$, and $31_3$ made up of three AC$\leftarrow\rightarrow$AC inverters $35_{11}$, $35_{12}$, and $35_{13}$, three AC$\leftarrow\rightarrow$AC inverters $35_{21}$, $35_{22}$, and $35_{23}$, and three AC$\leftarrow\rightarrow$AC inverters $35_{31}$, $35_{32}$, and $35_{33}$, that convert insulated power from transformer 34 to single-phase AC power. PWM generators $36_{11}$, $36_{12}$, ..., $36_{33}$ are added to AC$\leftarrow\rightarrow$AC inverters $35_{11}$, $35_{12}$, ..., $35_{33}$, respectively.

Figure 14:
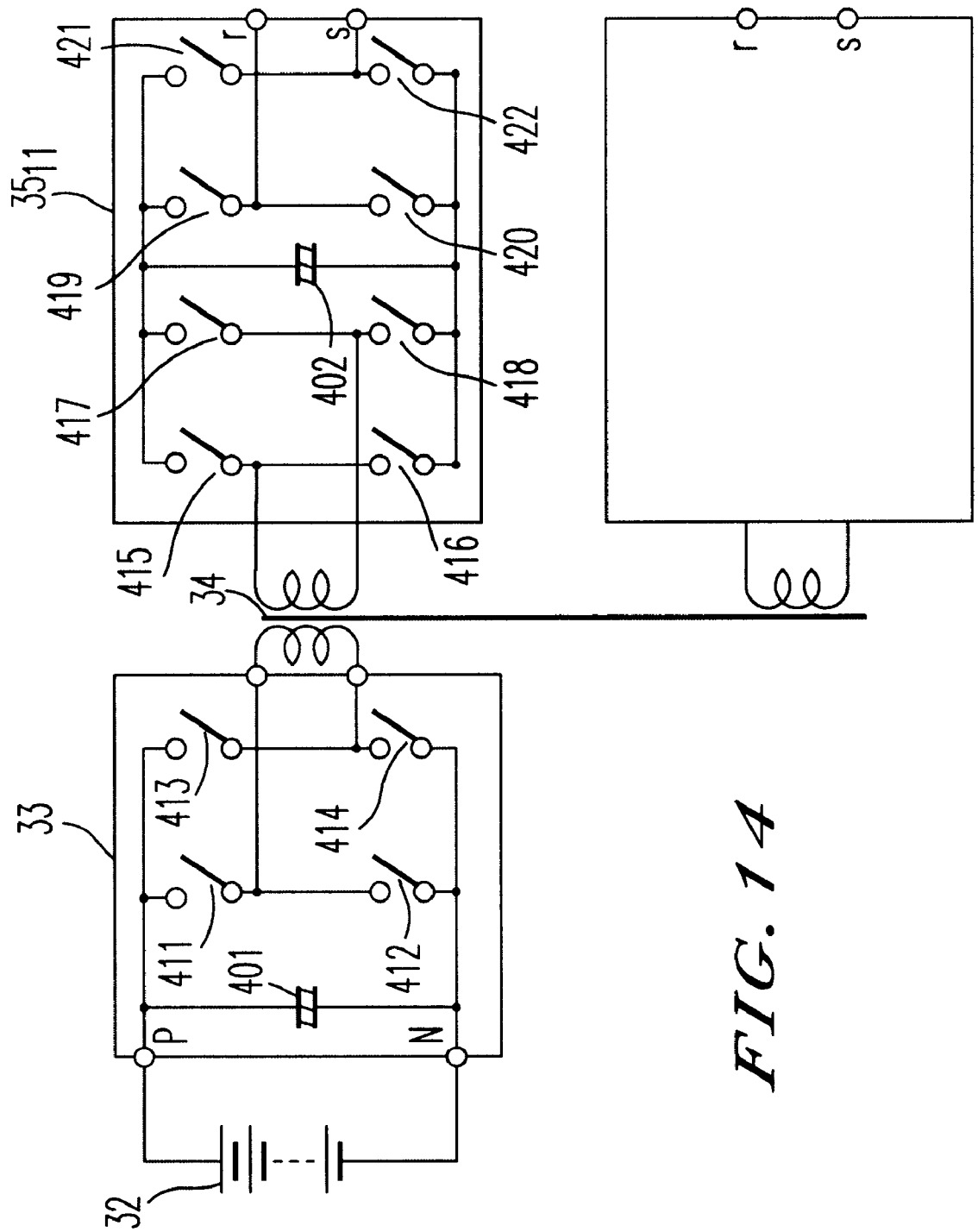
FIG. 14 is a circuit diagram showing DC←→SAC inverter 33 and AC←→AC inverters $35_{11}$–$35_{33}$ of the power conversion device shown in FIG. 13.

FIG. 14 is a circuit diagram showing DC$\leftarrow\rightarrow$AC inverter 33 and AC$\leftarrow\rightarrow$AC inverters $35_{11}$–$35_{33}$.

DC$\leftarrow\rightarrow$AC inverter 33 is made up of capacitor 401 and semiconductor switches 411–414, and AC$\leftarrow\rightarrow$AC inverters $35_{11}$–$35_{33}$ are each made up of capacitor 402 and semiconductor switches 415–422.

Single-phase AC terminal s of AC$\leftarrow\rightarrow$AC inverter $35_{11}$ is connected to single-phase AC terminal r of AC$\leftarrow\rightarrow$AC inverter $35_{12}$, and single-phase AC terminal s of AC$\leftarrow\rightarrow$AC inverter $35_{12}$ is connected to single-phase AC terminal r of AC$\leftarrow\rightarrow$AC inverter $35_{13}$. Single-phase AC terminal s of AC$\leftarrow\rightarrow$AC inverter $35_{21}$ is connected to single-phase AC terminal r of AC$\leftarrow\rightarrow$AC inverter $35_{22}$, and single-phase AC terminal s of AC$\leftarrow\rightarrow$AC inverter $35_{22}$ is connected to single-phase AC terminal r of AC$\leftarrow\rightarrow$AC inverter $35_{23}$. Single-phase AC terminal s of AC$\leftarrow\rightarrow$AC inverter $35_{31}$ is connected to single-phase AC terminal r of AC$\leftarrow\rightarrow$AC inverter $35_{32}$, and single-phase AC terminal s of AC$\leftarrow\rightarrow$AC inverter $35_{32}$ is connected to single-phase AC terminal r of AC$\leftarrow\rightarrow$AC inverter $35_{33}$. Single-phase AC terminals r of each of AC$\leftarrow\rightarrow$AC inverters $35_{11}$, $35_{21}$, and $35_{31}$ are connected to input terminals u, v, and w, respectively, of three-phase AC motor 1. Single-phase AC terminals s of each of AC$\leftarrow\rightarrow$AC inverters $35_{13}$, $35_{23}$, and $35_{33}$ are connected together in a star configuration (neutral point b).

Charging power supply 2 and switch 3, which connects charging power supply 2 to three-phase AC motor 1 during charging of battery 32, are provided between neutral point b and neutral point a of three-phase AC motor 1.

Figure 4:
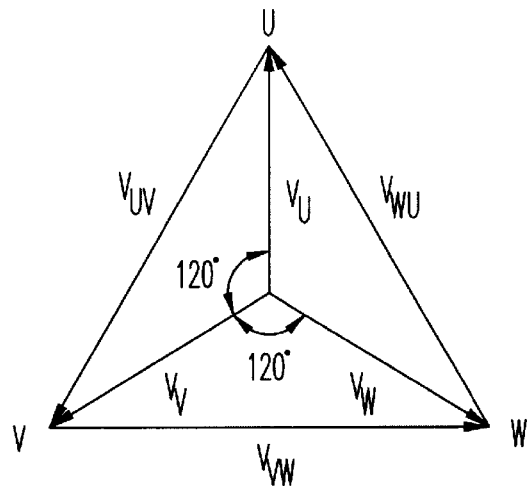
FIG. 4 is a vector diagram showing the relation between the output voltages $V_u$, $V_v$, and $V_w$ from single-phase PWM inverters $13_{11}$–$13_{33}$ and interphase voltages $V_{uv}$, $V_{vw}$, and $V_{wu}$ of three-phase AC m or 1 in FIG. 2.

The three AC←→AC inverters $35_{11}$–$35_{13}$, $35_{21}$–$35_{23}$, and $35_{31}$–$35_{33}$ of each of units $31_1$, $31_2$, and $31_3$, respectively, are each controlled by PWM generators such that the fundamental wave voltages of AC power applied to single-phase AC terminals r and s all have the same phase, and are controlled with multiple pulse-width modulation by the PWM generators so as to generate AC output in which the fundamental wave voltages from the three units $31_1$, $31_2$, and $31_3$ are each separated by an electrical angle of 120°, and three-phase AC motor 1 is driven. FIG. 4 shows the relation between interphase voltages $V_{uv}$, $V_{vw}$, and $V_{wu}$ applied across the three input terminals u, v, and w of three-phase AC motor 1 and AC output voltages $V_u$, $V_v$, and $V_w$ of each of units $31_1$, $31_2$, and $31_3$. As can be seen from FIG. 4, the voltages $V_u$, $V_v$, and $V_w$ necessary for each of units $31^1$–$31^3$ to output should be $\frac{1}{3} \cdot 3^{1/2}$ the amplitude of interphase voltages $V_{uv}$, $V_{vw}$, and $V_{wu}$. In addition, since each of units $31_1$–$31_3$ includes three AC←→AC inverters, the maximum output voltage from each of AC←→AC inverters $35_{11}$–$35_{33}$ should be $\frac{1}{3} \cdot 3^{1/2}$ the amplitude of interphase voltages $V_{uv}$, $V_{vw}$, and $V_{wu}$ of three-phase AC motor 1, and the battery voltage of AC←→AC inverters $35_{11}$–$35_{33}$ should also be $\frac{1}{3} \cdot 3^{1/2}$ of interphase voltages $V_{uv}$, $V_{vw}$, and $V_{wu}$ of three-phase AC motor 1. Semiconductor switches 415–422 of AC←→AC inverters $35_{11}$–$35_{33}$ may therefore be for lower voltage than in the prior art. Moreover, the output voltage may be further increased if a triple harmonic wave is added to the sine wave voltage command for the AC←→AC PWM inverters as described in "Control Device for Three-phase Inverter" of Japanese Patent Laid-open No. 28276/88.

The power supply can be taken from one battery 32 because battery 32 and AC←→AC inverters $35_{11}$–$35_{33}$ are insulated. In addition, the battery voltage and the value of the secondary-side voltage of transformer 34 can be freely determined in the design stage by merely varying the turn ratio of transformer 34. If a construction is adopted in which a step-up/step-down converter is controlled by DC←→AC inverter 33 and transformer 34, the input voltage of AC←→AC inverters $35_{11}$–$35_{33}$ can be freely varied. Further, increasing the frequency of the AC power that passes through transformer 34 enables the use of a compact transformer. The capacitance of AC←→AC inverters $35_{11}$–$35_{33}$ need only be sufficient to accommodate the capacitance obtained by dividing the total output by the number of inverter modules (in this case, nine), and each of AC←→SAC inverters $35_{11}$–$35_{33}$ can therefore be miniaturized.

When charging, the three units $31_1$, $31_2$, and $31_3$ are connected in parallel with charging power supply 2 when AC or DC charging power supply 2 is connected to neutral points a and b by way of switch 3. Battery 32 can be charged if the flow of the power of DC←→AC inverter 33 and one or a plurality of units is controlled to regenerate at this time.

Figure 15:
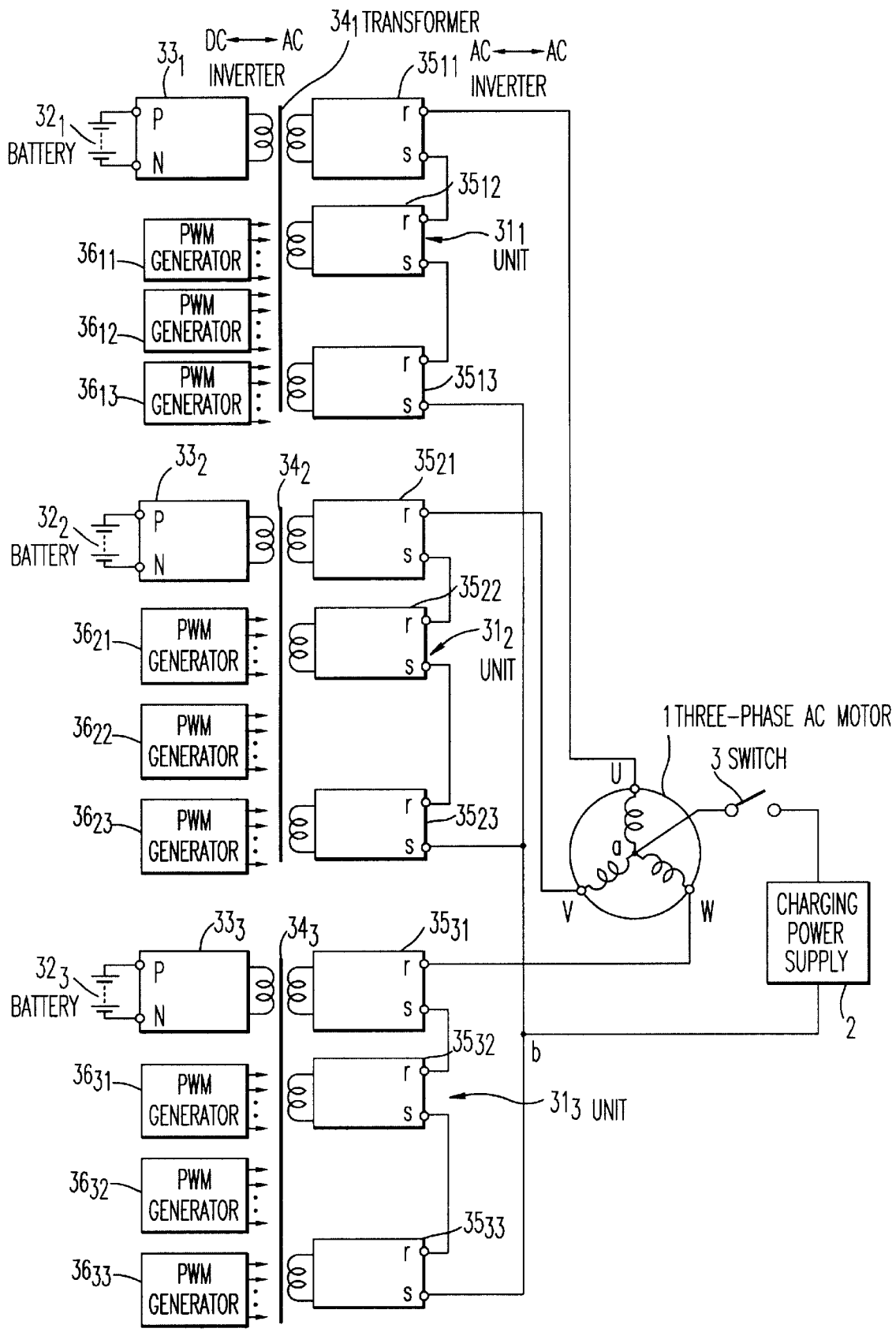
FIG. 15 shows the construction of the multiple pulse-width modulation power conversion device according to a fifth embodiment of the present invention.

FIG. 15 shows the structure of a power conversion device using a multiple pulse-width modulation according to a fifth embodiment of the present invention.

The power conversion device of this embodiment assigns battery 32, DC←→SAC inverter 33, and transformer 34 of the power conversion device according to the fourth embodiment shown in FIG. 13 to each of units $31_1$, $31_2$, and $3_{13}$, batteries $32_1$, $32_2$, and $32_3$, DC←→AC inverters $33_1$, $33_2$, and $33_3$, and transformers $34_1$, $34_2$, and $34_3$ being assigned to units $31_1$, $31_2$, and $31_3$, respectively. The construction of this embodiment is otherwise equivalent to that of the power conversion device according to the fourth embodiment.

What is claimed is:

1. A multiple pulse-width modulation power conversion device for variable-speed drive of a three-phase AC motor, comprising:

three units, each unit including n (n≧2) batteries each made up of a DC power supply or at least one battery cell, n power converters for converting DC power of each of said batteries to single-phase AC power, and n residual capacitance detectors for detecting residual capacitance of said batteries;

wherein single-phase AC terminals within each unit are connected in series, one of the single-phase AC terminals that is not connected to a single-phase terminal of another power converter is connected to a star connection, and the other single-phase AC terminal that is not connected is connected to a respective one of three input terminals of said three-phase AC motor;

further comprising control circuits for controlling said power converters such that AC applied to single-phase AC terminals of said n power converters within each unit are of the same phase, and moreover, for effecting multiple pulse-width modulation such that AC outputs from the three units are separated by an electrical angle of 120°, and each unit further comprising means for determining the ratio of fundamental wave amplitude of AC voltages from said n power converters connected in series, based on residual capacitance detected by each of said residual capacitance detectors.

2. A multiple pulse-width modulation power conversion device for variable-speed drive of a three-phase AC motor, comprising:

three units, each unit including n (n≧2) batteries each made up of a DC power supply or at least one battery cell, and n power converters for converting DC power of each of said batteries to single-phase AC power;

wherein single-phase AC terminals within each unit are connected in series, one of the single-phase AC terminals that is not connected to a single-phase terminal of another power converter is connected to a star connection, and the other single-phase AC terminal that is not connected is connected to a respective one of three input terminals of said three-phase AC motor;

further comprising control circuits for controlling said power converters such that AC outputs applied to single-phase AC terminals of said n power converters within each unit are of the same phase, and moreover, for effecting multiple pulse-width modulation such that AC outputs from the three units are separated by an electrical angle of 120°, and wherein a charging power supply and an ON/OFF switch are connected in series between the star connection point of the single-phase AC terminals of said three units and a neutral point of winding of said three-phase AC motor; and after turning on said ON/OFF switch, switching of conductive states of switch elements in a power converter causes individual charging or batch charging of batteries of that power converter.

3. A multiple pulse-width modulation power conversion device for variable-speed drive of a three-phase AC motor, comprising:

a battery made up of a DC power supply or at least one battery cell; and three units, each unit including n (n≧2) first power converters for converting DC power of said battery to AC power, n transformers for insulating output from each first power converter, and n second power converters for converting power from each transformer to single-phase AC power;

wherein single-phase AC terminals within each unit are connected in series, one of the single-phase AC terminals that are not connected to the single-phase AC terminal of another second power converter is connected to a star connection, and the other single-phase AC terminal that is not connected is connected to a respective one of three input terminals of said three-phase AC motor; and further comprising control circuits for controlling second power converters such that AC outputs applied to single-phase AC terminals of n second power converters within each unit are of the same phase, and moreover, for effecting multiple pulse-width modulation such that AC outputs from the three units are separated by an electrical angle of 120°;

wherein charging power supply and an ON/OFF switch are connected in series between the star connection point of the single-phase AC terminals of said three units and a neutral point of winding of said three-phase AC motor; and after turning on said ON/OFF switch, switching of conductive states of switch elements of a power converter causes individual charging or batch charging of batteries of that power converter.

4. A multiple pulse-width modulation power conversion device for variable-speed drive of a three-phase AC motor, comprising:

a battery made up of a DC power supply or at least one battery cell;

a first power converter for converting DC power of said battery to AC power;

a transformer taking output of said first power converter as primary-side input and having insulated output on its secondary side; and three units, each unit including n (n≧2) second power converters for converting insulated power from said transformer to single-phase AC power;

wherein single-phase AC terminals within each unit are connected in series, one of the single-phase AC terminals that is not connected to a single-phase AC terminal of another second power converter is connected to a star connection, and the other single-phase AC terminal that is not connected is connected to a respective one of three input terminals of said three-phase AC motor; and further comprising control circuits for controlling second power converters such that AC outputs applied to single-phase AC terminals of n second power converters within each unit are of the same phase, and moreover, for effecting multiple pulse-width modulation such that AC outputs from the three units are separated by an electrical angle of 120°;

wherein a charging power supply and an ON/OFF switch are connected in series between the star connection point of the single-phase AC terminals of said three units and a neutral point of winding of said three-phase AC motor; and after turning on the ON/OFF switch, switching of conductive states of switch elements of a power converter causes individual charging or batch charging of batteries of that power converter.

5. A power conversion device according to claim 4 wherein one each of said battery, said first power converter, and said transformer are provided in each unit.

* * * * *